April 17, 1951 W. O. DAVIS 2,548,954
MEANS FOR MOUNTING INSTRUMENTS
Filed Aug. 4, 1947 2 Sheets-Sheet 1
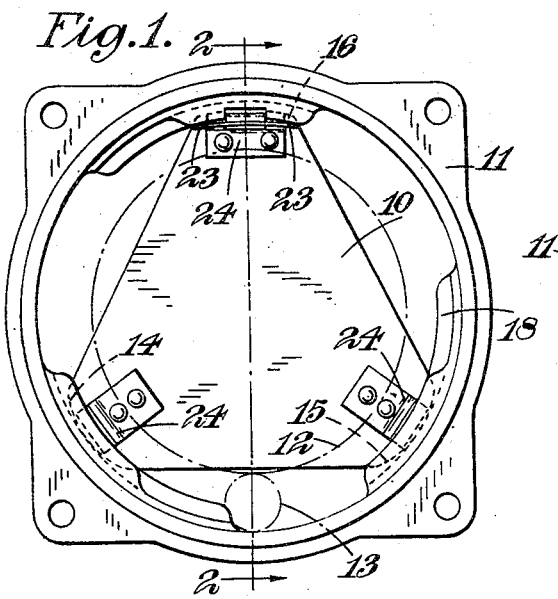
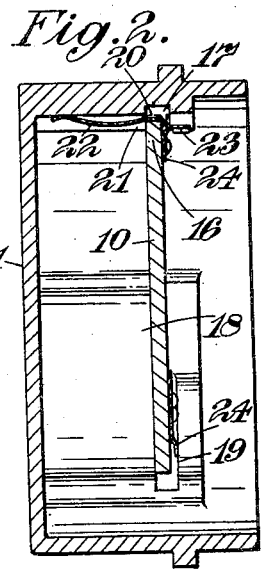
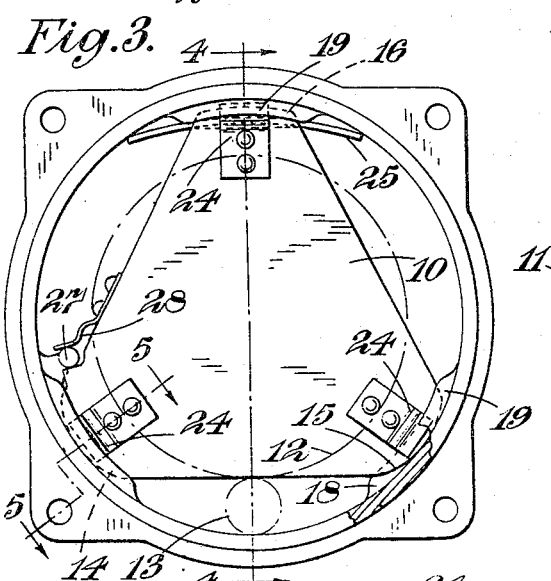
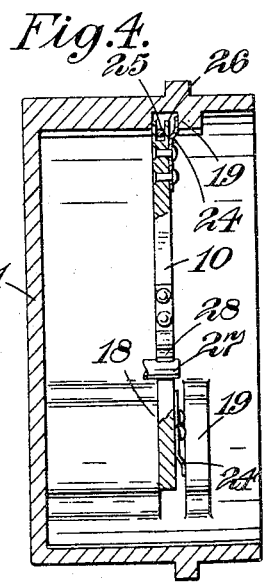
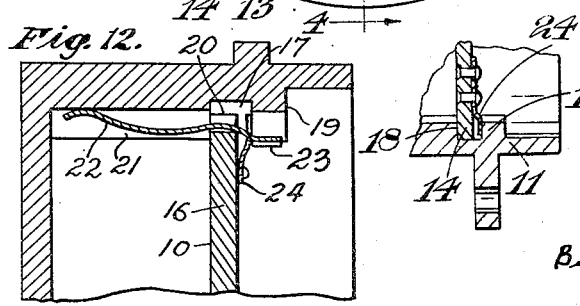
INVENTOR
W. O. Davis
By Watson, Cole, Grindle & Watson April 17, 1951 W. O. DAVIS 2,548,954
MEANS FOR MOUNTING INSTRUMENTS
Filed Aug. 4, 1947 2 Sheets-Sheet 2

INVENTOR
W. O. Davis
By Watson, Cole, Grindle & Watson

Patented Apr. 17, 1951

2,548,954

UNITED STATES PATENT OFFICE 2,548,954

MEANS FOR MOUNTING INSTRUMENTS

Wilfred Owen Davis, London, England, assignor to S. Smith & Sons (England) Limited, London, England, a British company Substituted for abandoned application Serial No. 417,843, November 4, 1941. This application August 4, 1947, Serial No. 765,977. In Great Britain July 13, 1940

Section 1, Public Law 690, August 8, 1946
Patent expires July 13, 1960

6 Claims. (Cl. 73—431)

This invention relates to the mounting of instruments or other small mechanisms in casings and the object of the invention is to locate the mechanism accurately with respect to some part in the casing, and at the same time prevent possible distortion of the casing affecting the mechanism, for instance, causing it to operate incorrectly.

This application is a substitute for abandoned application Serial No. 417,843, filed November 4, 1941.

The present invention comprises a mounting for instrument or other small mechanisms in casings and holding the mechanism fixed in a given plane in the casing wherein the mechanism contacts rigidly with the casing at only two positions in said plane to locate the mechanism in this plane and wherein means is provided to hold the mechanism resiliently against the casing at the two contact positions and to prevent riding of the mechanism on the casing at the contact positions. In this manner distortion of the casing can to a large extent take place without affecting the mechanism, it being preferable to locate the positions of a rigid contact near to the part in relation to which the mechanism has to be accurately positioned. The invention includes the provision of similar mounting means to locate the mechanism in any other plane in the casing and it is preferable to employ resilient means holding the mechanism against movement in a direction normal to the plane first referred to.

A further feature of the invention consists in that the means to hold the mechanism resiliently against the casing at the two contact positions also serve to prevent riding of the mechanism at the contact positions. Another feature of the invention consists in that the means to hold the mechanism resiliently against the casing at the two contact positions also constitutes the means for holding the mechanism against movement in a direction normal to the said plane.

In a preferred arrangement the casing comprises three abutments spaced around the casing for locating the mechanism in the direction normal to the said plane and the two contact positions for the mechanism are formed by parts of the wall of the casing lying in one arc and adjoining two of the said abutments. Each of these abutments conveniently consists of one wall of a groove in the casing and the mechanism may be formed by providing the mechanism with parts to enter into these grooves. By rotation of the mechanism in the said plane, the mechanism can easily be inserted in position in the casing.

The resilient means holding the mechanism against movement in a direction normal to the said plane may conveniently comprise springs interposed between the mechanism and the wall of each groove opposite to that forming an abutment for the mechanism.

In one specific construction the casing is formed with a slot crossing that groove which is remote from the contact positions and a spring disposed between the casing and the mechanism to hold the latter against the casing at the contact positions has a part engaging in said slot and in a slot in the mechanism to prevent rotation of the mechanism in the casing. In another construction, a spring is interposed between the casing and the mechanism adjacent that part engaged in the groove remote from the contact positions in order to hold the mechanism rigidly at these positions and co-operating stops are provided on the casing and on the mechanism to prevent the mechanism rotating in the casing. In yet another construction the spring interposed between the mechanism and the wall of that groove remote from the contact positions is arranged also to apply end thrust to the mechanism so as to constitute the resilient means holding the mechanism rigidly against the casing at the contact positions. In a further construction a spring is connected between the mechanism and the casing and is so inclined to the aforesaid plane as to hold the mechanism against said abutments and also against the casing at the said two contact positions.

Specific embodiments of the invention are illustrated by way of examples in the accompanying drawings, in which:

Figure 1 is an elevation of an instrument and casing showing one form of mounting;

Figure 2 is a section on line 2—2 of Figure 1;

Figure 3 is an elevation of an instrument and casing showing another form of mounting;

Figure 4 is a section on line 4—4 of Figure 3;

Figure 5 is a section on line 5—5 of Figure 3;

Fig. 12 is an enlarged detail of the upper portion of the section on line 2—2 of Figure 1.

In the drawings, like parts are indicated by like references in the several figures of the drawings.

Figure 6:
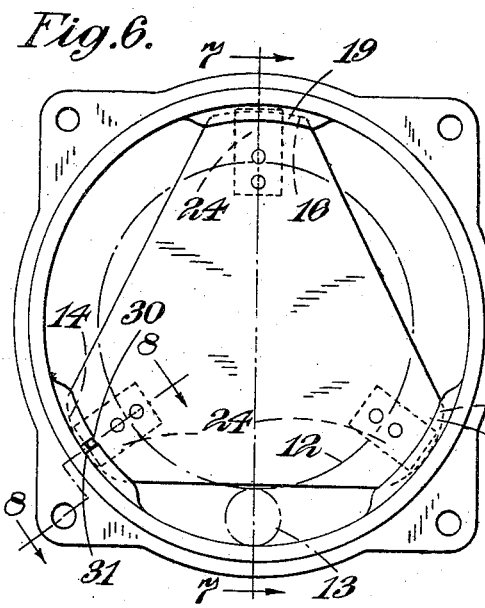
Figure 6 is an elevation of an instrument and casing showing a further form of mounting.

One specific application of the invention is to an altimeter in which the mechanism is rotatably mounted in a supporting plate and has a gear-wheel meshing with an idler pinion rotatably mounted in the casing and in turn meshing with another pinion also rotatably mounted in the casing and connected to an adjusting knob at the exterior of the casing. The mechanism is rotated by means of the knob to adjust the zero of the instrument for any desired atmospheric pressure which is indicated by a disc carried by the mechanism and calibrated in millibars which is visible through an aperture in the dial of the instrument. With this construction of altimeter it is desirable that the mechanism should be positioned with the gear-wheel in fixed relation to the idler pinion in the casing and also to prevent any distortion in the casing affecting the mechanism.

Referring to Figures 1 and 2 of the drawings, the mechanism is carried on a supporting plate 10 and is housed in a casing 11, the mechanism having a gear-wheel 12 meshing with an idler pinion 13 in the casing, as above described. The supporting plate 10 is approximately of triangular shape with two rounded corners 14 and 15, the third corner 16 also being rounded or flattened. The plate fits loosely by means of the corners 14, 15 and 16 in three grooves 17 in a cylindrical wall of the casing and extending a short distance around this wall, each of the corners have secured to it a spring blade 24. The rear wall 18 of each of these grooves is longer than the front wall so that the mechanism can be readily inserted in the grooves by first resting the corner parts of the supporting plate on the rear walls 18 of the grooves and then rotating it so that these parts lie properly within the grooves. The supporting plate is held against abutments constituted by the walls 18 of the grooves by means of springs interposed between the supporting plate and the front walls 19 of these grooves. Such springs are conveniently leaf-springs 24 fixed on the corners of the supporting plate 10 and having their free ends engaging with the wall 19 of the groove. The spring 24 at the corner 16 of the supporting plate is bifurcated at its free end. To simplify inserting the springs 24 behind the front walls of the grooves 17, these walls are of different lengths so that the springs may be inserted in succession.

The parts of the inner cylindrical wall of the casing at the base of the grooves 17 constitute the rigid contact positions aforesaid for the supporting plate of the mechanism. The rounded corners 14 and 15 of the supporting plate have a radius smaller than the radius of the curvature of the inner wall of the casing so that the corners 14 and 15 maintain line contact with the casing. The corner 16 of the supporting plate is formed with a transverse slot 20 as is also the spring blade 24 secured to it and a corresponding slot 21 is provided in the casing, this slot extending through the front and rear walls 19 and 18'. A leaf-spring 22 is inserted into the slots 20 and 21 and so prevents rotation of the supporting plate 10 in the casing. This spring is T-shaped and when in position the cross bar 23 bears on the inner cylindrical face of the wall 19 and extends across the transverse slab in that wall and bears on top of the slotted spring blade 24. The other limb 22 of the spring is bowed. Thus the T-shaped spring serves to press the corners 14 and 15 of the supporting plate into rigid engagement with the inner wall of the casing within the corresponding grooves 17 and so hold the mechanism to the casing at the contact positions in addition to preventing its rotation or riding on the casing at the contact positions. It will thus be seen that the supporting plate is located accurately with respect to the pinion 13 but is free to move against the action of the arms 23 of the spring 22 should distortion of casing occur.

In the construction shown in Figures 3 to 5, instead of leaf-springs 22, 24 a spring wire 25 is engaged in an edgewise groove 26 in the corner 16 of the plate 10 and engages at its ends on the inner wall of the casing so as to hold the corners 14 and 15 of the supporting plate rigidly against the casing. In this case, separate means for preventing rotation of the mechanism consists of a pin 27 carried by the casing engaging between the supporting plate 10 and a spring member 28 secured to the supporting plate.

Figure 7:
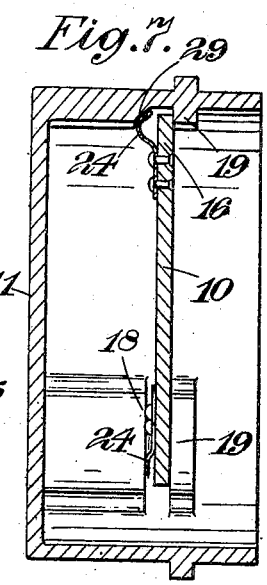
Figure 7 is a section on line 7—7 of Figure 6.
Figure 8:
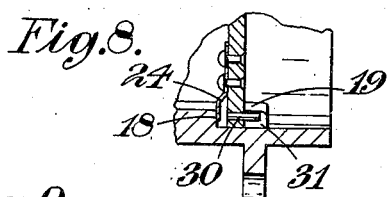
Figure 8 is a section on line 8—8 of Figure 6.

In the construction shown in Figures 6 to 8, the supporting plate 10 of the mechanism is mounted on abutments formed by the front walls 19 of the grooves 17. The groove 17 receiving the corner 16 of the supporting plate has its rear wall bevelled, as indicated at 29, and the spring 24 is shaped to engage this bevelled wall 29. Thus, this spring 24, in addition to holding the corner 16 of the supporting plate against the front wall 19 of the groove, also presses the corners 14 and 15 of the supporting plate into rigid contact with the casing. The supporting plate 10 is prevented from rotating by means of a dowel pin 30 engaging in a recess 31 in the front wall of the groove housing the corner 14 of the supporting plate.

Figure 11:
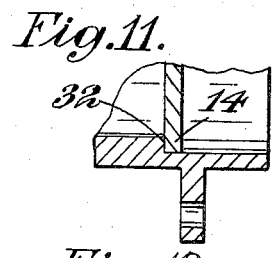
Figure 11 is a section on line 11—11 of Figure 9.
Figure 9:
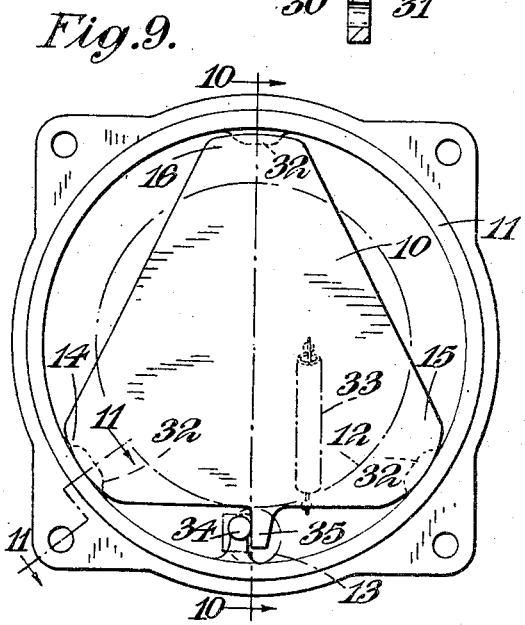
Figure 9 is an elevation of an instrument and casing showing yet another form of mounting.
Figure 10:
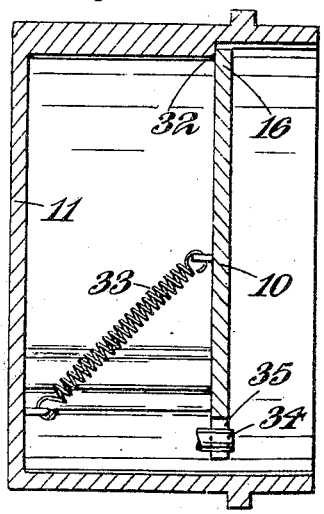
Figure 10 is a section on line 10—10 of Figure 9.

In the construction shown in Figures 9 to 11, instead of grooves receiving the corners of the supporting plate 10, simple abutments 32 are employed and the supporting plate is held against these abutments by means of a tension spring 33 connected at one end to the supporting plate 10 and at the other end to the casing 11. This spring is inclined with respect to the supporting plate 10 so as to draw the plate down to bring the corners 14 and 15 rigidly into contact with the casing and so locate the supporting plate accurately with respect to the pinion 13. A stop pin 34 is provided on the casing and engaged by a stop 35 on the supporting plate and the spring 33 is connected to the supporting plate 10 at a position displaced from its centre so that the spring tends to turn the supporting plate in the direction to hold the stop 35 against the pin 34.

By the means of mounting the altimeter mechanism in its casing as hereinbefore described with reference to the drawings, erroneous readings of the instrument due to distortion of the casing are avoided. The invention is, however, not restricted to altimeters but is applicable to the mounting of other instrument or like mechanisms in casings in definite relation or not to another part of the casing.

I claim:

1. An instrument mounting comprising an instrument support, a casing surrounding said support and provided with three inward projections disposed in a common plane, each of said projections being slotted to receive a part of said support, said support being provided with corner portions to contact the bottom of two of said slots, and resilient means carried by the said portions and engageable with the said casing to maintain said contact.

2. An instrument mounting comprising an instrument support, a casing surrounding said instrument support and provided with three inward projections, disposed in a common plane, each of which projections being formed with slots for accommodating a part of the support, said support being provided with corner portions to contact the bottom of two of said slots, resilient means carried by said portions, for pressing the support against one wall of each slot and means for urging the support against bottom of two of said slots.

3. An instrument mounting composition an instrument support, a casing surrounding said instrument support provided with three inward projections disposed in a common plane and spaced around the casing, each of which projections being slotted to receive a part of said support, said support being provided with corner portions similarly spaced to the spacing of the aforesaid projections two of which abut rigidly against the bottom of two of said slots, a spring interposed between the casing and a part of the support on the opposite side thereof to said two corner portions, and detent means for preventing rotation of the support in the casing after engagement with said slots.

4. An instrument mounting comprising an instrument support, a casing surrounding said instrument support and provided with three inward projections disposed in a common plane and spaced apart around the casing, each of which projections being slotted to receive a part of said support, said support being provided with corner portions similarly spaced to the spacing of the aforesaid projections two of which contact rigidly with the bottom of two of said slots, a spring arranged between the wall of the casing and a part of the support arranged on the opposite side thereof to the said two corner portions, which spring is arranged both to maintain the contact of the support with the bottom of said two slots and to urge it against a side wall of each of the slots.

5. An instrument mounting comprising an instrument support, a casing surrounding said instrument support provided with three inward projections disposed in a common plane each of which projections being slotted to receive a part of said support, said support being arranged to contact rigidly with the bottom of two of said slots, and a helical tension spring connected at one end to said support and at the other end to a part of the casing so as to be inclined to the plane of said support and so as to draw it against the bottom of two of said slots and against a side wall of each of said slots.

6. An instrument mounting comprising an instrument support, a casing surrounding said instrument support and provided with three inward projections each of which is provided with a slot, said support being provided with three corner portions engageable respectively with said slots and two of which corner portions are arranged to contact rigidly with the bottom of two of said slots respectively, and one of the walls of the other of which slots is cut away to provide a recess, a resilient member on the other corner of the support arranged to spring into said recess when the corners have entered said slots so as to maintain the support against rotation, and so as to maintain the first two projections at the bottom of the slot.

WILFRED OWEN DAVIS.

REFERENCES CITED

The following references are of record in the file of this patent:

UNITED STATES PATENTS

| Number | Name | Date |
| --- | --- | --- |
| Re. 18,283 | Johnson | Dec. 15, 1931 |
| 1,952,037 | Cordero et al. | Mar. 20, 1934 |
| 2,215,537 | Bjong | Sept. 24, 1940 |

FOREIGN PATENTS

| Number | Country | Date |
| --- | --- | --- |
| 543,257 | Great Britain | Feb. 17, 1942 |
| 817,277 | France | Aug. 31, 1937 |